US011242806B2

(12) United States Patent
Bothien et al.

(10) Patent No.: US 11,242,806 B2
(45) Date of Patent: Feb. 8, 2022

(54) METHOD OF CONTROLLING FUEL INJECTION IN A REHEAT COMBUSTOR FOR A COMBUSTOR UNIT OF A GAS TURBINE

(71) Applicant: ANSALDO ENERGIA SWITZERLAND AG, Baden (CH)

(72) Inventors: Mirko Ruben Bothien, Zürich (CH); Douglas Pennell, Windisch (CH); Peter Stuttaford, Jupiter, FL (US)

(73) Assignee: POWER SYSTEMS MFG., LLC, Jupiter, FL (US)

(*) Notice: Subject to any disclaimer, the term of this patent is extended or adjusted under 35 U.S.C. 154(b) by 472 days.

(21) Appl. No.: 15/817,861

(22) Filed: Nov. 20, 2017

(65) Prior Publication Data

US 2019/0154263 A1    May 23, 2019

(51) Int. Cl.
*F02C 9/26* (2006.01)
*F23R 3/16* (2006.01)
(Continued)

(52) U.S. Cl.
CPC ........... *F02C 9/26* (2013.01); *F02C 7/228* (2013.01); *F02C 9/263* (2013.01); *F23R 3/12* (2013.01); *F23R 3/16* (2013.01); *F23R 3/286* (2013.01); *F23R 3/34* (2013.01); *F23C 2900/07001* (2013.01); *F23R 3/36* (2013.01); *F23R 2900/03341* (2013.01)

(58) Field of Classification Search
CPC ...... F23R 3/02; F23R 3/12; F23R 3/14; F23R 3/16; F23R 3/20; F23R 3/28; F23R 3/30; F23R 3/34; F23R 3/286; F23R 3/36; F23R 2900/00013; F23R 2900/00014; F23R 2900/03341; F02C 7/22; F02C 7/222; F02C 7/224; F02C 7/228; F02C 9/26; F02C 9/263; F23C 6/042; F23C 6/047; F23C 2900/07001; F23D 11/40; F23D 14/62; F23D 14/64; F23D 14/70; F23D 2900/21003; F05D 2260/96
See application file for complete search history.

(56) References Cited

U.S. PATENT DOCUMENTS 5,836,164 A  * 11/1998  Tsukahara .............. F23C 6/047
                                                   60/733
8,938,971 B2 *  1/2015  Poyyapakkam ........ F23D 14/62
                                                   60/770
(Continued)

FOREIGN PATENT DOCUMENTS

EP    2725301 A1    4/2014
EP    3184748 A1    6/2017

OTHER PUBLICATIONS

The extended European Search Report dated Feb. 13, 2019, by the European Patent Office in corresponding European Application No. 18207407.0. (10 pages).

*Primary Examiner* — William H Rodriguez
(74) *Attorney, Agent, or Firm* — Hovey Williams LLP

(57) ABSTRACT

A method is disclosed for controlling fuel injection in a reheat combustor of a gas turbine combustor assembly including a combustor casing defining a gas flow channel and a plurality of injection nozzles distributed in or around the gas flow channel; the method includes the step of distributing fuel among the injection nozzles according to a non-uniform distribution pattern.

9 Claims, 5 Drawing Sheets

(51) Int. Cl.
    *F23R 3/34*     (2006.01)
    *F23R 3/12*     (2006.01)
    *F02C 7/228*     (2006.01)
    *F23R 3/28*     (2006.01)
    *F23R 3/36*     (2006.01)

(56) References Cited

U.S. PATENT DOCUMENTS

| | | | | |
|---|---|---|---|---|
| 9,347,663 | B2* | 5/2016 | Poyyapakkam | F23C 7/004 |
| 9,829,200 | B2* | 11/2017 | Gao | F23R 3/346 |
| 10,352,568 | B2* | 7/2019 | Eroglu | F23R 3/36 |
| 10,422,283 | B2* | 9/2019 | Yang | F02C 7/222 |
| 10,443,852 | B2* | 10/2019 | Yang | F23R 3/16 |
| 10,753,615 | B2* | 8/2020 | Wood | F23R 3/286 |
| 2010/0170219 | A1 | 7/2010 | Venkataraman et al. | |
| 2012/0285172 | A1* | 11/2012 | Poyyapakkam | F23R 3/14 |
| | | | | 60/737 |
| 2014/0109588 | A1* | 4/2014 | Ciani | F23R 3/286 |
| | | | | 60/776 |
| 2014/0123665 | A1* | 5/2014 | Wood | F23R 3/12 |
| | | | | 60/774 |
| 2015/0047364 | A1* | 2/2015 | Gao | F23C 7/004 |
| | | | | 60/774 |
| 2016/0146470 | A1* | 5/2016 | Dusing | F23R 3/286 |
| | | | | 60/737 |
| 2016/0230668 | A1* | 8/2016 | Yang | F23R 3/20 |
| 2016/0281606 | A1* | 9/2016 | Heynen | F02C 9/40 |
| 2017/0089584 | A1* | 3/2017 | Poyyapakkam | F23R 3/18 |
| 2018/0100653 | A1* | 4/2018 | Wood | F23R 3/36 |

* cited by examiner

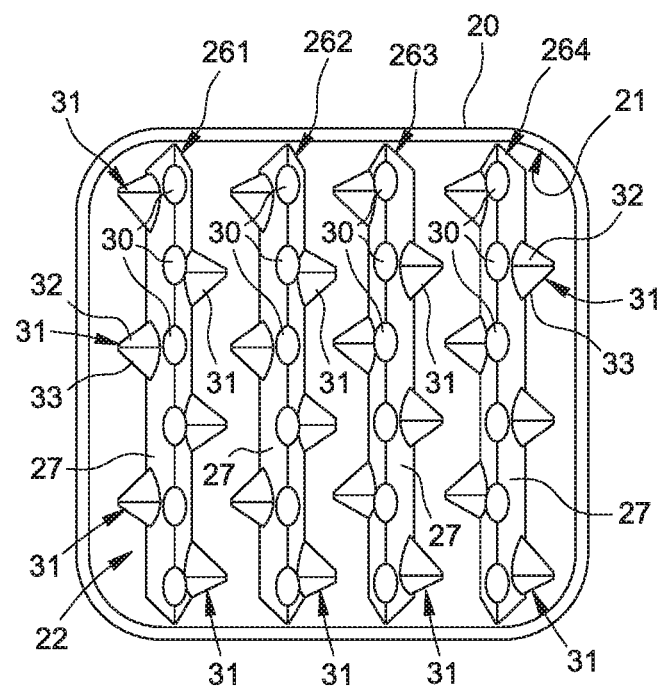
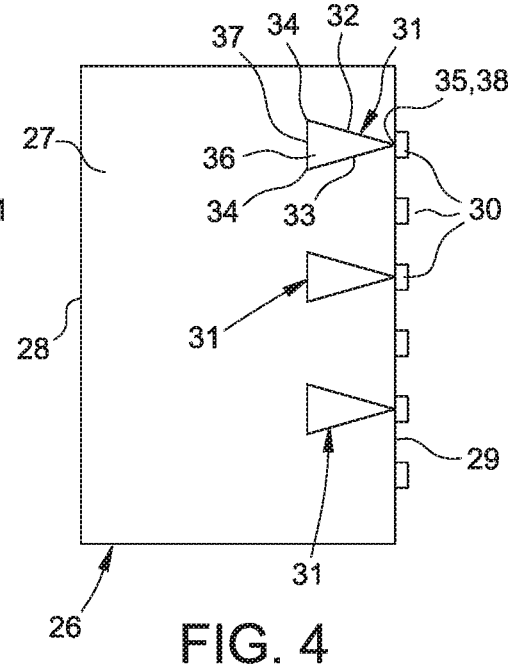
FIG. 3
FIG. 4
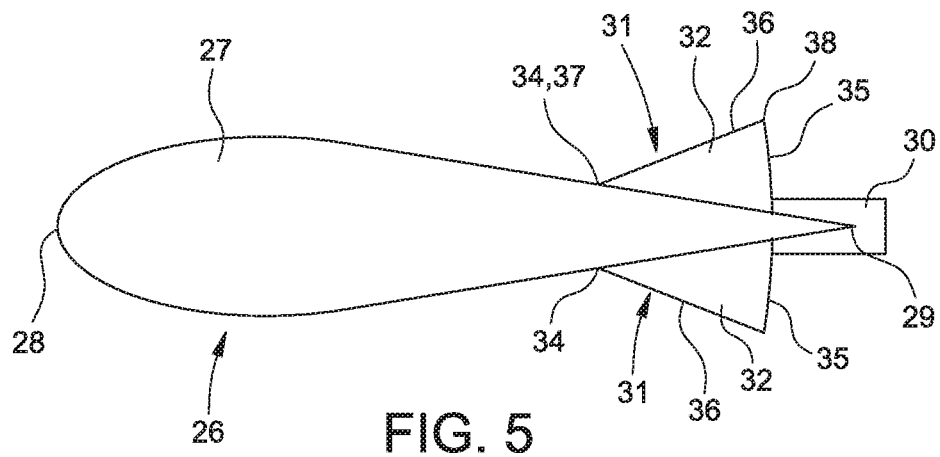
FIG. 5

METHOD OF CONTROLLING FUEL INJECTION IN A REHEAT COMBUSTOR FOR A COMBUSTOR UNIT OF A GAS TURBINE

BACKGROUND OF THE INVENTION

Field of the Invention

The present invention relates to a method of controlling fuel injection in a reheat combustor for a sequential gas turbine for power plants. In particular, the present invention relates to controlling fluid supply to reheat injection nozzles so as to minimize thermoacoustic pulsations.

Description of Prior Art

As is known, a gas turbine for power plants (in the following, "gas turbine" only) comprises an upstream compressor, a combustor assembly and a downstream turbine. The turbine includes a rotor comprising a compressor section and a turbine section.

The terms downstream and upstream as used herein refer to the direction of the main gas flow passing through the gas turbine.

In particular, the compressor comprises an inlet supplied with air and a plurality of blades compressing the passing air. The compressed air leaving the compressor flows into a plenum, i.e. a closed volume, and from there into the combustor, where the compressed air is mixed with at least one fuel. The mixture of fuel and compressed air flows into a combustion chamber inside the combustor where this mixture is combusted. The resulting hot gas leaves the combustor and is expanded in the turbine, producing mechanical work on the rotor.

In order to achieve a high efficiency, a high turbine inlet temperature is required. However, due to this high temperature, high NOx emissions are generated.

In order to reduce these emissions and to increase operational flexibility, gas turbines have been developed which comprise a combustor assembly performing a sequential combustion cycle.

In general, a sequential combustor assembly comprises two combustors in series, wherein each combustor is provided with a respective burner and combustion chamber. Following the main gas flow direction, the upstream combustor is called "premix" combustor and is fed by the compressed air. The downstream combustor is called "sequential" or "reheat" combustor and is fed by the hot gas leaving the first combustion chamber.

According to a first known configuration, the two combustors are physically separated by a high pressure turbine. Following the main gas flow, this first configuration includes the compressor, the premix combustor, the high-pressure turbine, the reheat combustor and a low-pressure turbine.

According to a second known configuration, the premix and the reheat combustor are arranged directly one downstream the other inside a common casing, in particular a can-shaped casing, and no high-pressure turbine is used. According to this kind of sequential gas turbines, a plurality of can combustors are provided, which are distributed around the turbine axis.

Each can combustor is provided with a hot gas flow channel, a reheat burner housed in the flow channel, and a reheat combustion chamber into which the flow channel opens downstream of the reheat burner. A transition duct arranged downstream the reheat combustion chamber guides the hot gas leaving the reheat combustor toward the turbine.

The reheat burner may include a plurality of injection units in the form of substantially parallel rails or "fingers" which are arranged side-by-side and spaced with respect to one another inside the hot gas flow channel. Each of the injection units has a body extending across the gas flow channel along a first direction orthogonal to the gas flow direction, and has a streamlined shape along the gas flow direction with a leading edge and a trailing edge. Each finger bears at its trailing edge a plurality of fuel injection nozzles that are spaced between one another along the first transverse direction.

According to a known embodiment, the injection units have integrated mixing devices configured for mixing the injected fuel with the passing hot gas flow. The mixing devices can be constituted by vortex generators in the form of triangular appendices extending from the sides of the injection units upstream from each nozzle, or by an undulated profile of the trailing edge.

The reheat burner flame, in certain operating conditions, generates self-excited thermoacoustic pulsations which may exceed acceptable pulsation limits and undesirably restrict the gas turbine operational range. This may impair operational flexibility of the gas turbine.

SUMMARY OF THE INVENTION

A primary object of the present invention is to provide a method for reducing flame pulsations which is cost effective and does not affect NOx emissions.

This object is attained, according to the present invention, by a method of controlling fuel injection in a reheat combustor of a combustor assembly of a gas turbine, the reheat combustor including:
   a combustor casing defining a gas flow channel and a combustion chamber, and
   a plurality of fuel injection nozzles distributed in or around the gas flow channel;
wherein the method includes the step of distributing fuel among the injection nozzles according to a non-uniform distribution pattern. By distributing fuel to injection nozzles according to a non-uniform distribution pattern when operational conditions occur that are prone to undesired thermoacoustic pulsations, the flame behavior can be controlled and instability prevented or reduced.

According to a preferred embodiment of the present invention, the non-uniform distribution pattern includes different fuel supply rates to injection nozzles injecting fuel into different flame regions in the combustion chamber. It is thus possible to influence the flame stability by enriching either the core portion of the combustion chamber, i.e. the auto-stabilized flame zone, or the outer (recirculation) portion of the combustion chamber, where the flame is propagation stabilized.

Preferably, the reheat combustor includes a plurality of injection units, each injection unit having:
   a body extending across the gas flow channel along a first direction orthogonal to a gas flow direction and having a streamlined shape along the gas flow direction with a leading edge and a trailing edge, and
   a plurality of fuel injection nozzles spaced along the first direction.
In this case, the non-uniform pattern can include a different fuel supply rate to at least one of the injection units with respect to the other injection units.

In particular, a non-uniform pattern can be selected including different fuel supply rates between two external injection units injecting fuel towards a propagation-stabilized flame region and one or more central injection unit injecting fuel towards an auto-ignition stabilized flame region of the combustion chamber.

Preferably, the fuel supply rate to the side injection units is greater than the fuel supply rate to the at least one central injection unit. It has been found that this distribution pattern has a favourable impact on certain pulsation frequencies without affecting emissions.

While differentiating the fuel distribution among the injection units has proven to be effective in most situation, more complex patterns including different individual fuel supply rates among the fuel nozzles in one or more of the injection units can be possible, and is encompassed in the scope of the present invention as defined by the claims.

According to another aspect, the present invention relates to a reheat combustor of a gas turbine including a fuel injection control unit controlling the fuel supply rates to the injection nozzles and configured to selectively distribute fuel among injection nozzles according to a non-uniform distribution patter as mentioned above.

Preferably, the injection units have integrated mixing devices configured for mixing the injected fuel with the passing hot gas flow. The mixing devices can be constituted by vortex generators in the form of shaped appendices extending from the sides of the injection units upstream from each nozzle, or by an undulated profile of the trailing edge of the injection units.

BRIEF DESCRIPTION OF DRAWINGS

For a better comprehension of the present invention and its advantages, an exemplary embodiment of the invention is described below in conjunction with the accompanying drawings, in which:

FIG. 3 is a schematic downstream view of the reheat combustor of the can combustor of FIG. 2;

FIG. 4 is a schematic side view of an injection unit of the reheat combustor of FIG. 3;

FIG. 5 is a schematic plan view of the injection unit of FIG. 4;

DETAILED DESCRIPTION OF EMBODIMENTS

Figure 1:
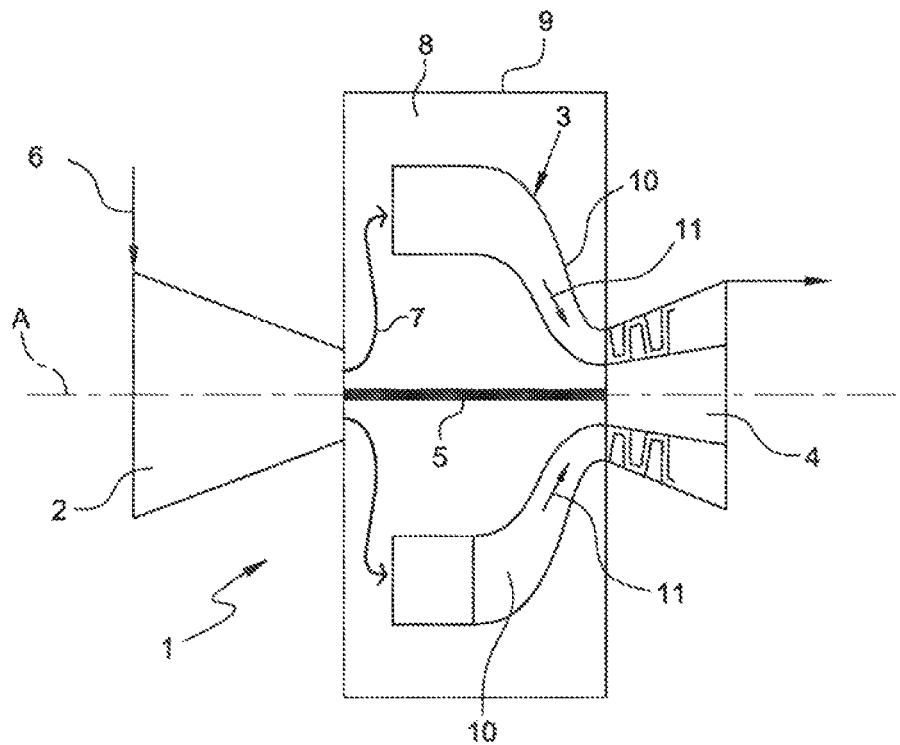
FIG. 1 is a schematic view of a gas turbine for power plants provided with a reheat combustor according to the present invention.

FIG. 1 is a schematic view of a gas turbine 1 for power plants that can be provided with a reheat combustor according to the present invention.

Gas turbine 1 comprises a compressor 2, a combustor assembly 3 and a turbine 4. Compressor 2 and turbine 4 have a common axis A and form respective sections of a rotor 5 rotatable about axis A.

As is known, ambient air 6 enters compressor 2 and is compressed. Compressed air 7 leaves compressor 2 and enters a plenum 8, i.e. a volume defined by an outer casing 9. From plenum 8, compressed air 7 enters combustor assembly 3 that comprises a plurality of can combustors 10 annularly arranged around axis A. Here at least a fuel is injected, and the air/fuel mixture is ignited, producing hot gas 11 that is conveyed to turbine 4.

Figure 2:
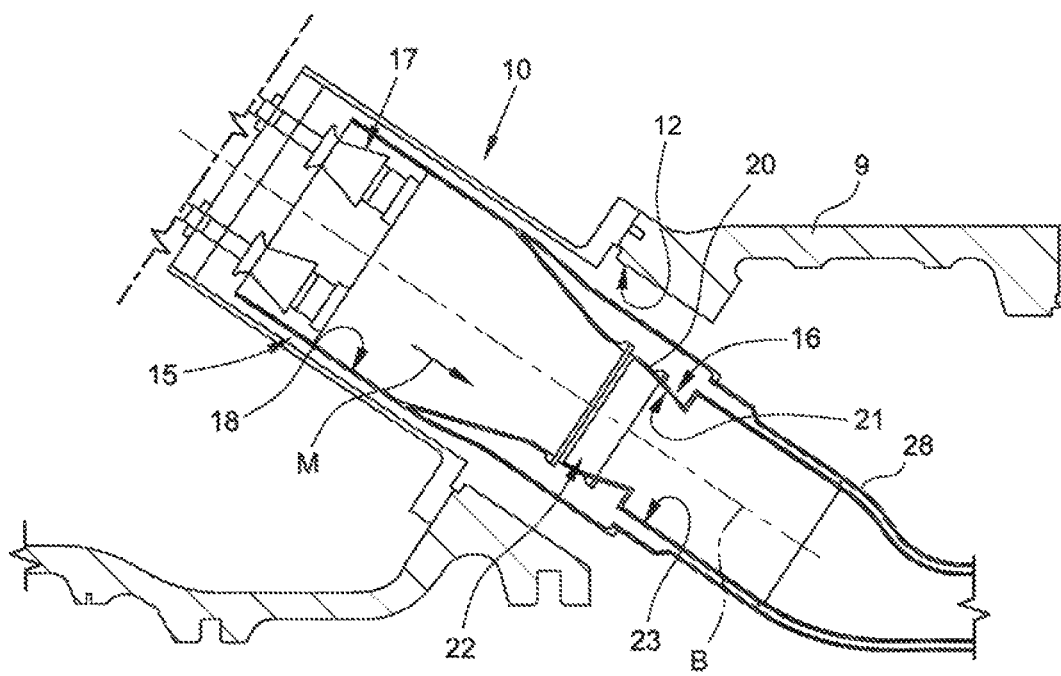
FIG. 2 is a schematic view of a can combustor including a premix combustor and a reheat combustor according to the invention.

As is better shown in FIG. 2, each can combustor 10 is housed in a respective portal hole 12 of the outer casing 9 and has an axis B. Can combustor 10 comprises, in series along gas flow M, a first or premix combustor 15 and a second or reheat combustor 16.

In particular, premix combustor 15 comprises a premix burner 17 and a first combustion chamber 18. Reheat combustor 16 comprises a housing 20 defining a channel 21 (better shown in FIGS. 3 and 7), a reheat burner 22 housed within the channel 21 and a second combustion chamber 23.

Reheat burner 22 comprises a plurality of, e.g. four, injection units collectively referenced 26, and individually referenced 261, 262, 263, 264. Injection units 26 are arranged across channel 21 for injecting fuel into the hot gas flow.

According to a variant not illustrated the injection units can be arranged around channel for injecting fuel into the hot gas flow.

FIG. 3 is a downstream schematic view of reheat burner 22 of the can combustor 10, i.e. reheat burner 22 is seen along axis B, counter to the hot gas flow direction.

Channel 21 has a square/rectangular cross section and a convergent shape.

Injection units 26 have a body 27 of substantially rectangular shape in side view (FIG. 4) with longer sides extending in a first direction parallel to one side of the channel 21 and orthogonal to the flow direction and shorter sides extending in the air flow direction. When seen along the first direction (FIG. 5), body 27 has a streamlined shape with a broader, rounded leading edge 28 defining one of the longer sides of body 27 and a narrower, pointed trailing edge 29 defining the other longer side of body 27.

Injection units 26 are arranged side-by-side across channel 21 (FIGS. 3 and 8) so as to extend substantially parallel to the first direction between opposite sides thereof, and are spaced between one another in a second direction orthogonal to the first direction. Injection units 26 are preferably slightly converging with respect to one another when seen along the first direction (FIG. 7), in order to follow the stream lines of the air passing through convergent channel 21.

Each of the injection units 26 includes a plurality of fuel injection nozzles 30 configured to inject fuel in the flow direction downstream of the trailing edge 29 and extend and are spaced with one another along the first direction. Injection nozzles 30, in a downstream view (FIG. 3), form a rectangular matrix of injection points across a section of channel 21, which are spaced along the first and the second directions.

Injection units 26 preferably comprise mixing devices configured to improve the fuel/air mixing.

According to a first embodiment (FIGS. 3-5), mixing devices are constituted by vortex generators 31 extending laterally from body 27, upstream of each fuel injection nozzle 30.

Preferably, a vortex generator 31 is associated to each injection nozzle 30. Vortex generators 31 project alternately on opposite lateral directions from body 27; according to the embodiment shown in FIG. 3, vortex generators 31 associated to the first, third and fifth fuel injection nozzle 30 project on one side, while vortex generators 31 associated to the second, fourth and sixth injection nozzle (30) project on the opposite side.

Vortex generators 31 have a substantially tetrahedral shape with one side resting against a lateral side of body 27.

More particularly, with reference to FIGS. 4 and 5, each vortex generator 31 is delimited in the first direction by two triangular side surfaces 32, 33 having respective upstream vertexes 34 at a side surface of body 27 and converge towards a common downstream base 35 that is perpendicular to the first direction and substantially perpendicular to the flow direction; each vortex generator is delimited in the second direction by a triangular surface 36 having an upstream base 37 at a side surface of body 27 and a downstream vertex 38 at a free end of common downstream base 35 of side surface 32, 33.

As an alternative, mixing devices can be constituted by an undulated shape of trailing edge 29 (FIG. 6) formed by lobes 40 extending in opposed lateral directions.

Figure 6:
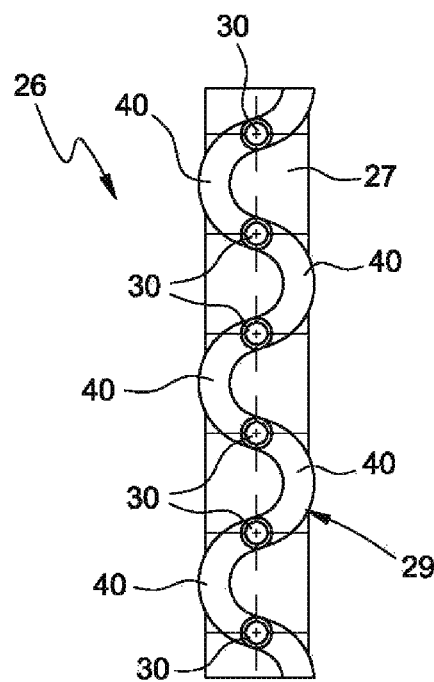
FIG. 6 is a schematic downstream view of an alternative embodiment of the injection unit.

Lobes 40 can be rounded, so as to form a substantially sinusoidal profile as shown in FIG. 6, or rectangular in shape, so as to form a substantially "square-wave" profile.

Figure 8:
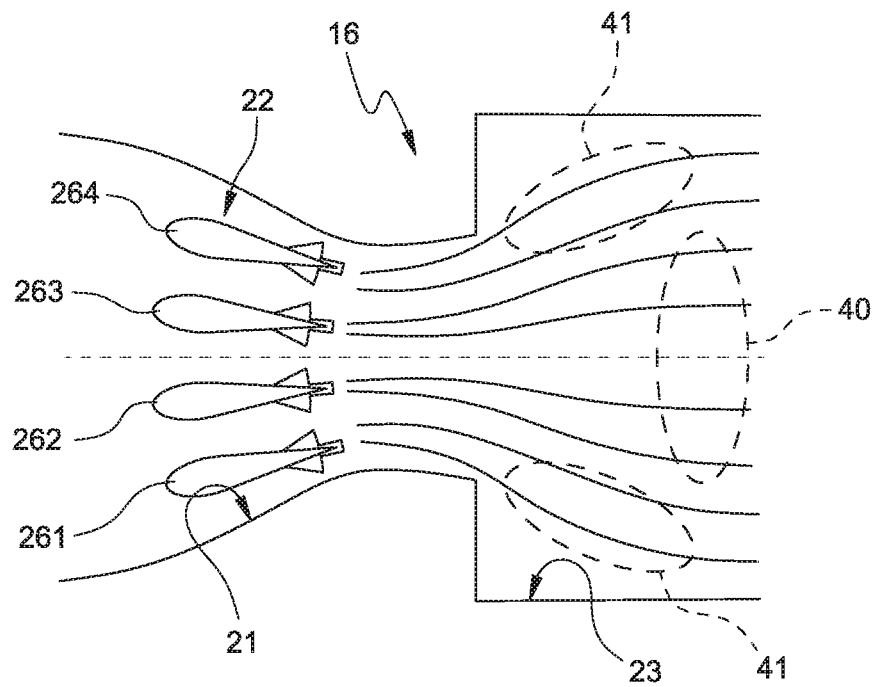
FIG. 8 is a schematic longitudinal cross sections of the reheat combustor of FIG. 3, in uniform fuel distribution conditions.

FIG. 8 is a schematic view of a conventional operational condition in which all injection nozzles 30 are supplied with the same fuel supply rate (uniform supply). As can be seen from the fuel streamlines schematically shown, the two central injection units 262, 263 mainly inject the fuel into a central, auto-ignition stabilized flame zone 40 of the combustion chamber 23, while the two external injection units 261, 264 mainly inject the fuel into a recirculation or propagation stabilized flame zone 41 of the combustion chamber 23.

According to the present invention, fuel supply is distributed non-uniformly among injection units 261-264 and/or individual injection nozzles 30 according to a predetermined pattern.

The predetermined pattern can either be fixed, i.e. determined once for all and maintained during operation of the gas turbine, or variable.

Figure 7:
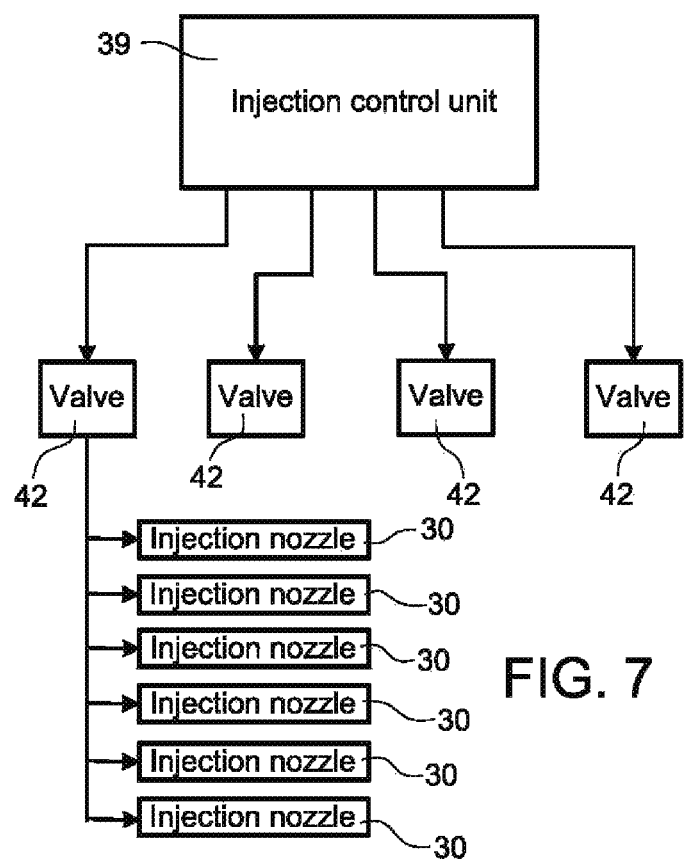
FIG. 7 is a block diagram of a fuel injection control system of the reheat combustor.

In the latter case, fuel supply to injection nozzles 30 may be adjusted by a valve unit controlled by a programmable control unit 39 according to one or more predetermined patterns as a function of operational conditions, e.g. load (FIG. 7).

The valve unit may comprise one valve 42 for each of the injection units 26, in which case all of injection nozzles 30 of a given injection unit 26 receive the same fuel supply rate (FIG. 7), or even one valve 42 for each injection nozzle 30 (not shown), in which case fuel supply rate can be controlled individually for each point of the injection matrix.

Figure 9:
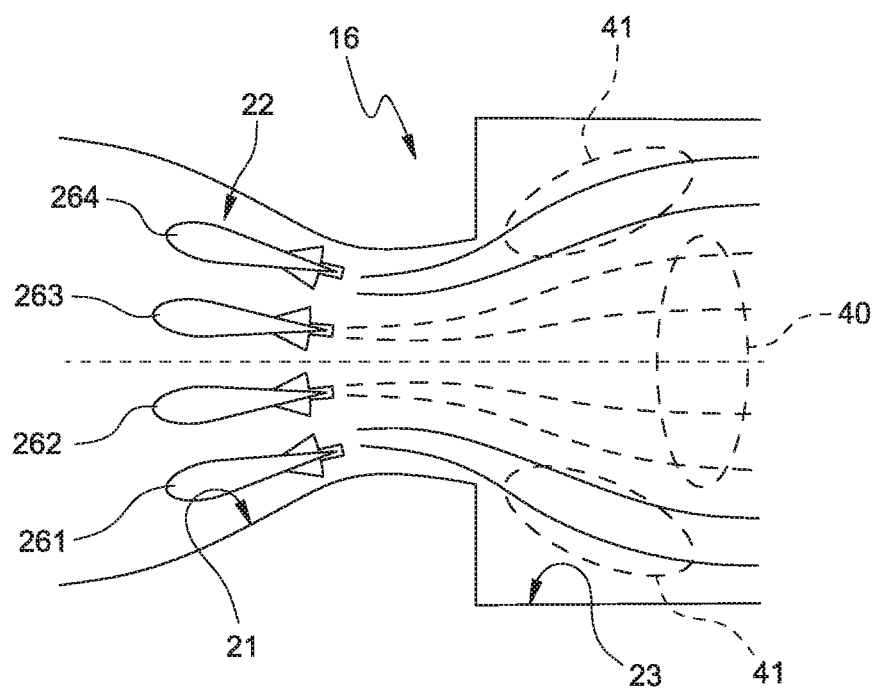
FIG. 9 is a schematic longitudinal cross sections of the reheat combustor of FIG. 3, in accordance with a first non-uniform distribution pattern.

According to one embodiment of the present invention, fuel is distributed non-uniformly between the auto-ignition stabilized flame region 40 and the propagation-stabilized flame region 41 so as to reduce thermo-acoustic pulsation. In particular, the distribution pattern comprises a greater fuel supply rate to the external injection units 261, 264 and a lower fuel supply rate to the central injection units 262, 263. The result is a richer air/fluid mixture in the propagation-stabilized region than in the auto-ignition region, as schematically shown in FIG. 9.

Figure 10:
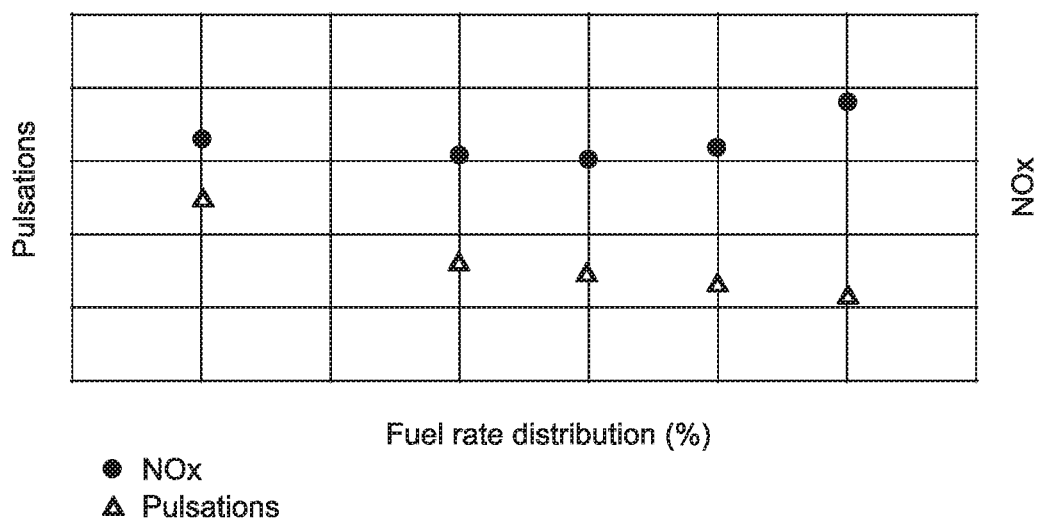
FIG. 10 is a diagram showing pulsation amplitude and NOx emission against fuel rate distribution.

FIG. 10 is a diagram where pulsation amplitude and NOx emissions are plotted against fuel rate distribution, expressed as the percentage ratio between fuel rate to outer injection units 261, 264 and the total fuel supply rate.

As can be seen, pulsations decrease as distribution percentage increases.

Figure 11:
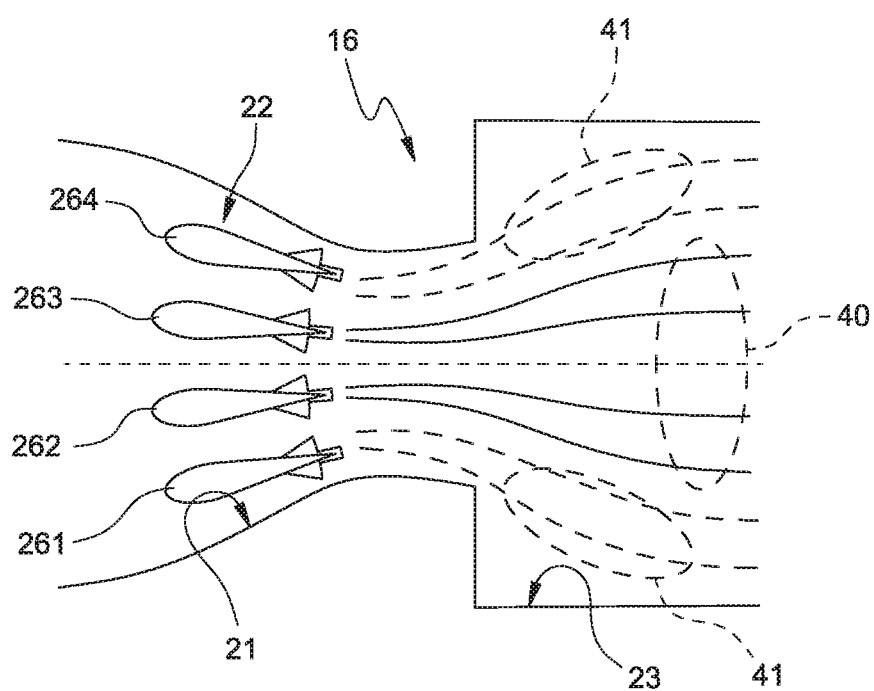
FIG. 11 is a schematic longitudinal cross sections of the reheat combustor of FIG. 3, in accordance with a second non-uniform distribution pattern.

FIG. 11 is a scheme showing an inverted fuel distribution, where a richer mixture is created in the auto-ignition stabilized flame region. Other distributions are possible, and individual control of injection nozzles 30 may allow 2-D distribution patterns.

Although the invention has been explained in relation to its preferred embodiment(s) as mentioned above, it is to be understood that many other possible modifications and variations can be made without departing from the scope of the appended claims.

The invention claimed is:

1. A method of controlling fuel injection in a reheat combustor of a combustor assembly of a gas turbine, the reheat combustor having a combustor casing defining a gas flow channel and a combustion chamber, wherein the reheat combustor includes a plurality of injection units, each injection unit having a body extending across the gas flow channel along a first direction orthogonal to a gas flow direction and having a streamlined shape along the gas flow direction with a leading edge and a trailing edge and a plurality of fuel injection nozzles spaced along the first direction;

the plurality of injection units being spaced along a second direction orthogonal to the first direction and including at least one central injection unit and two lateral injection units disposed at opposite sides of the at least one central injection unit along the second direction, wherein the method comprises:
 receiving a fuel flow; and
 distributing fuel among the injection nozzles according to a non-uniform distribution pattern,
wherein said distributing according to said non-uniform distribution pattern comprises:
 applying different fuel supply rates between the two lateral injection units injecting fuel towards a propagation-stabilized flame region and the at least one central injection unit injecting fuel towards an auto-ignition stabilized flame region of the combustion chamber, wherein the fuel supply rate to each of the lateral injection units is greater than the fuel supply rate to the at least one central injection unit.

2. The method according to claim 1, wherein said distributing according to said non-uniform distribution pattern comprises:
 applying different individual fuel supply rates among the injection nozzles in at least one of the injection units.

3. The method according to claim 1, wherein the at least one central injection unit includes at least two central injection units.

4. A reheat combustor, comprising:
 a combustor casing defining a gas flow channel and a combustion chamber;
 a plurality of side-by-side injection units, each injection unit having:
  a body extending across the gas flow channel along a first direction orthogonal to a gas flow direction and having a streamlined shape along the gas flow direction with a leading edge and a trailing edge;
  a plurality of fuel injection nozzles spaced along the first direction, the injection units being spaced along a second direction orthogonal to the first direction and including at least one central injection unit and two lateral injection units disposed at opposite sides of the at least one central injection unit along the second direction; and a controller for controlling fuel supply rates to said injection nozzles, wherein said controller is configured to distribute fuel among the injection nozzles according to a non-uniform distribution pattern, wherein said non-uniform distribution pattern includes applying different fuel supply rates between the two lateral injection units injecting fuel towards a propagation-stabilized flame region and the at least one central injection unit injecting fuel towards an auto-ignition stabilized flame region of the combustion chamber, wherein said non-uniform distribution pattern includes applying a fuel supply rate to each of the lateral injection units which is greater than a fuel supply rate to the at least one central injection unit.

5. The reheat combustor according to claim 4, wherein said non-uniform distribution pattern includes applying different individual fuel supply rates among the fuel nozzles in at least one of the injection units.

6. The reheat combustor according to claim 4, wherein said injection units comprises:

integrated mixing devices configured for mixing an injected fuel with passing hot gas flow.

7. The reheat combustor according to claim 6, wherein the mixing devices are vortex generators formed as lateral appendices extending from sides of the injection units upstream from each injection nozzle.

8. The reheat combustor according to claim 6, wherein the mixing devices are lobes of a trailing edge of each injection unit forming an undulated profile thereof.

9. The reheat combustor according to claim 4, wherein the at least one central injection unit includes at least two central injection units.

* * * * *